Figure 5:
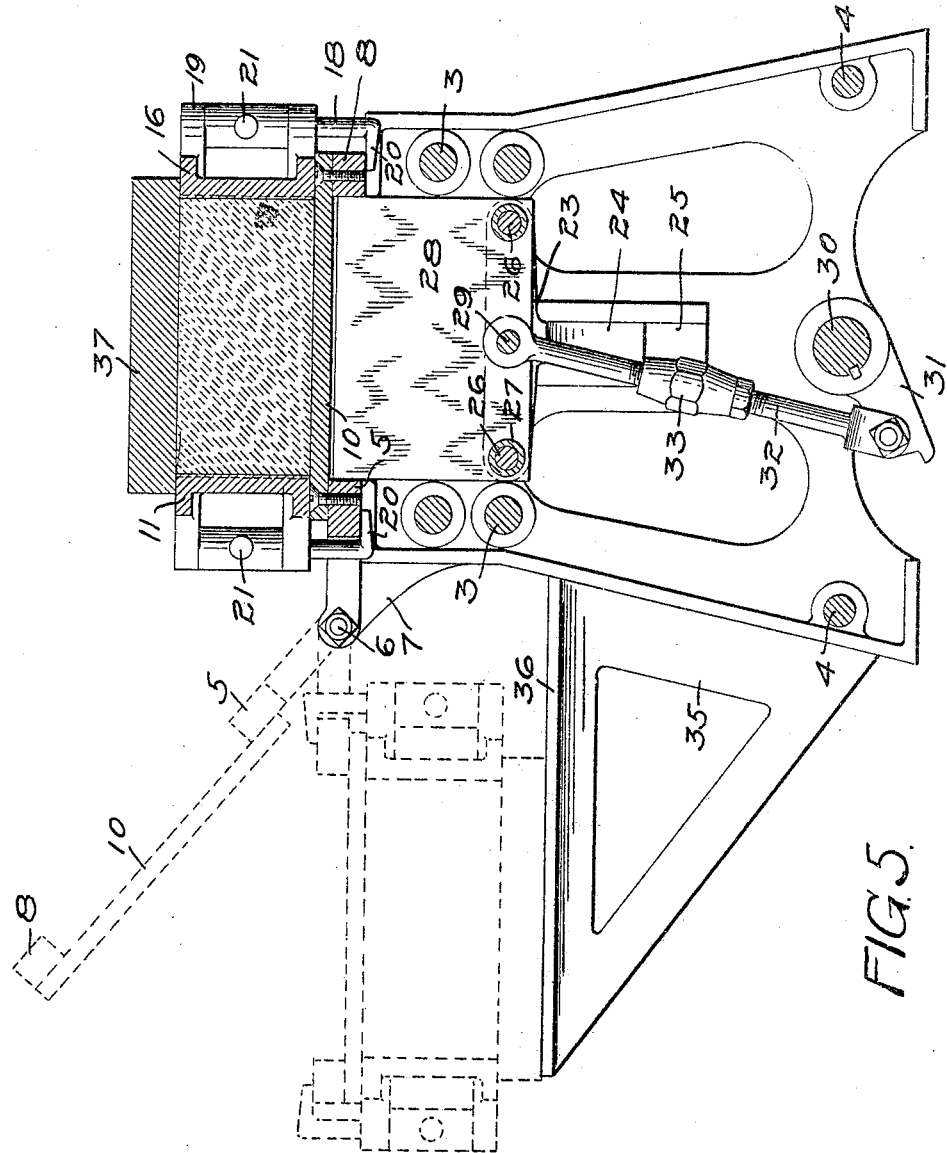

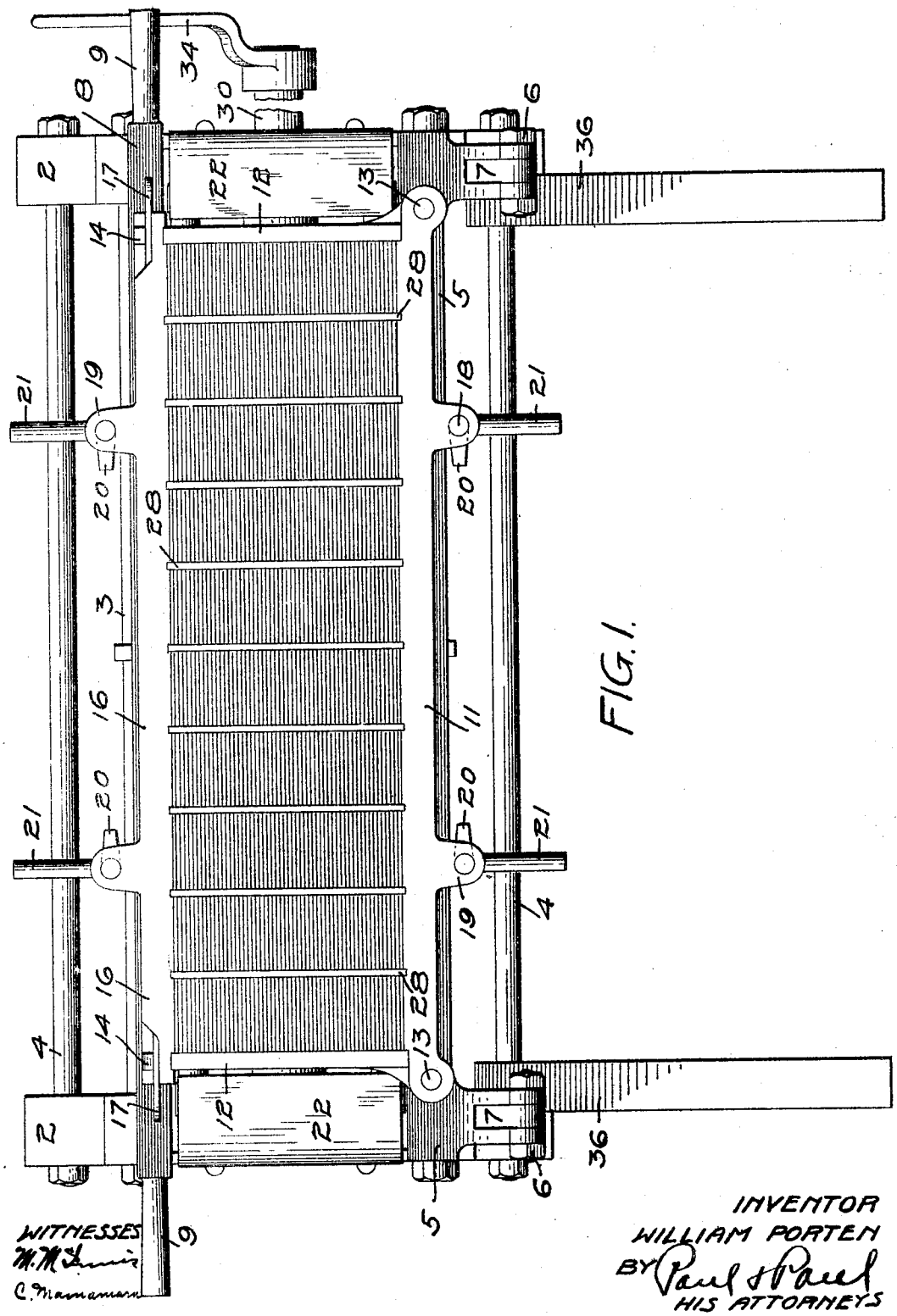

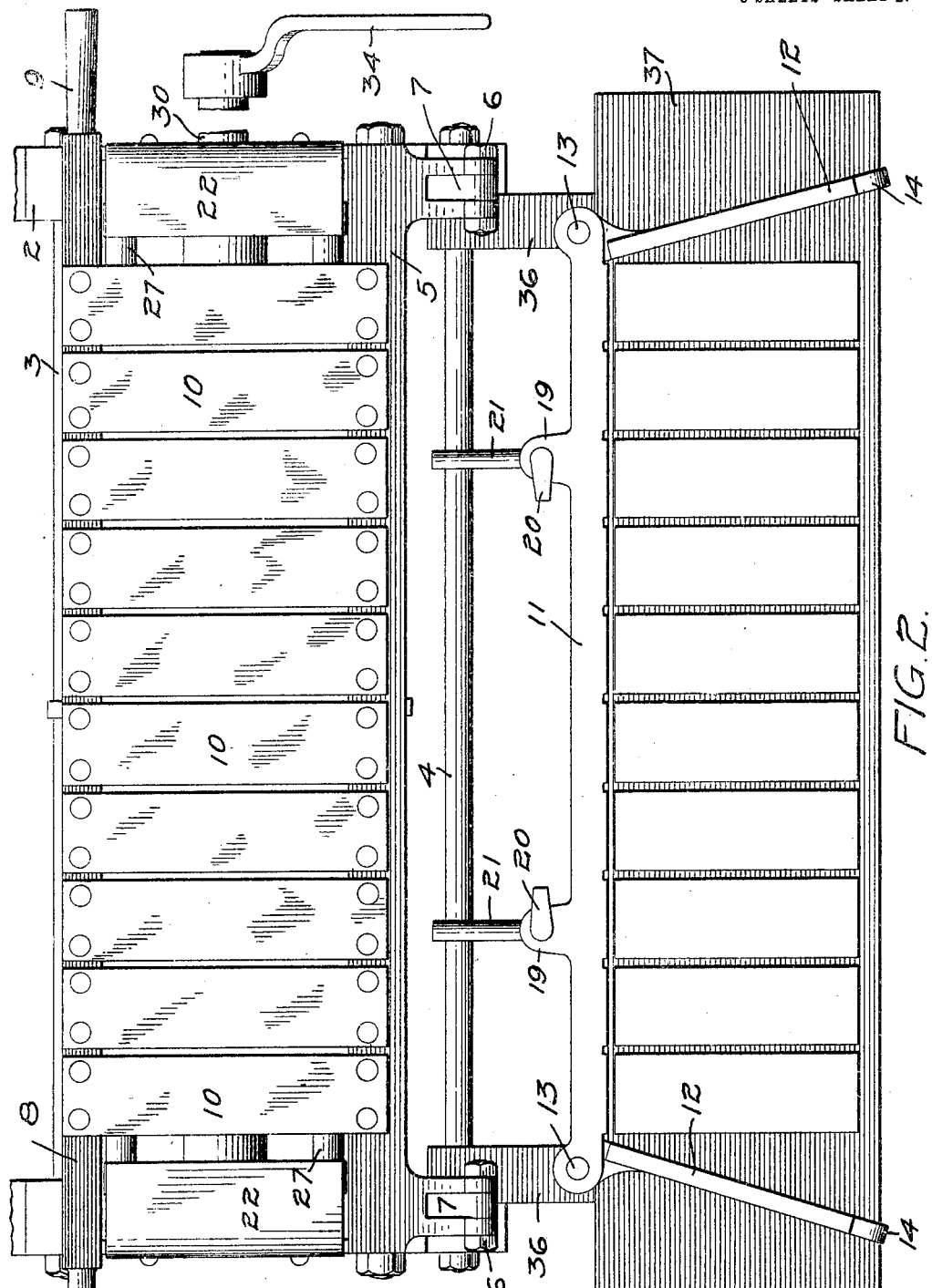

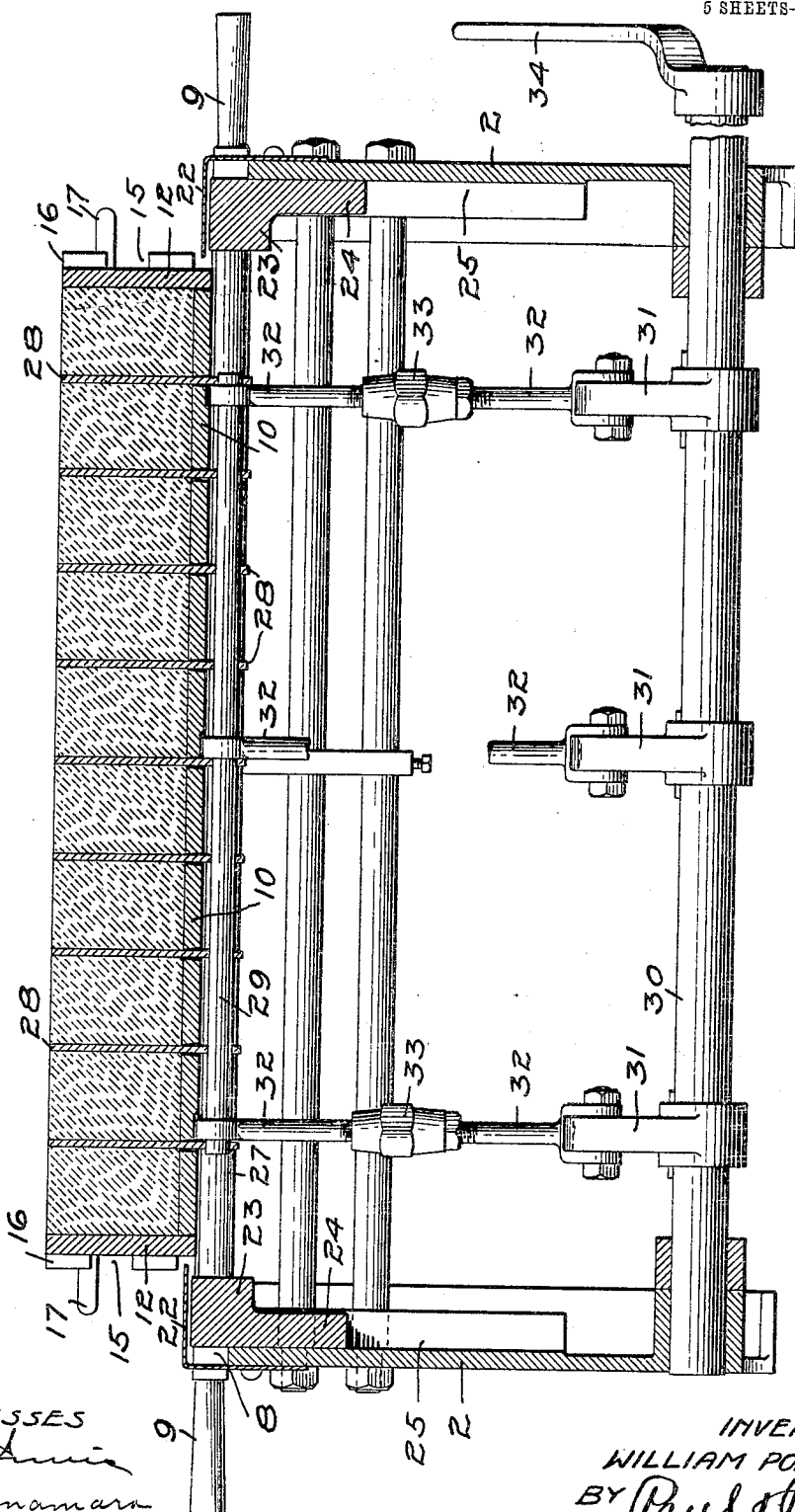

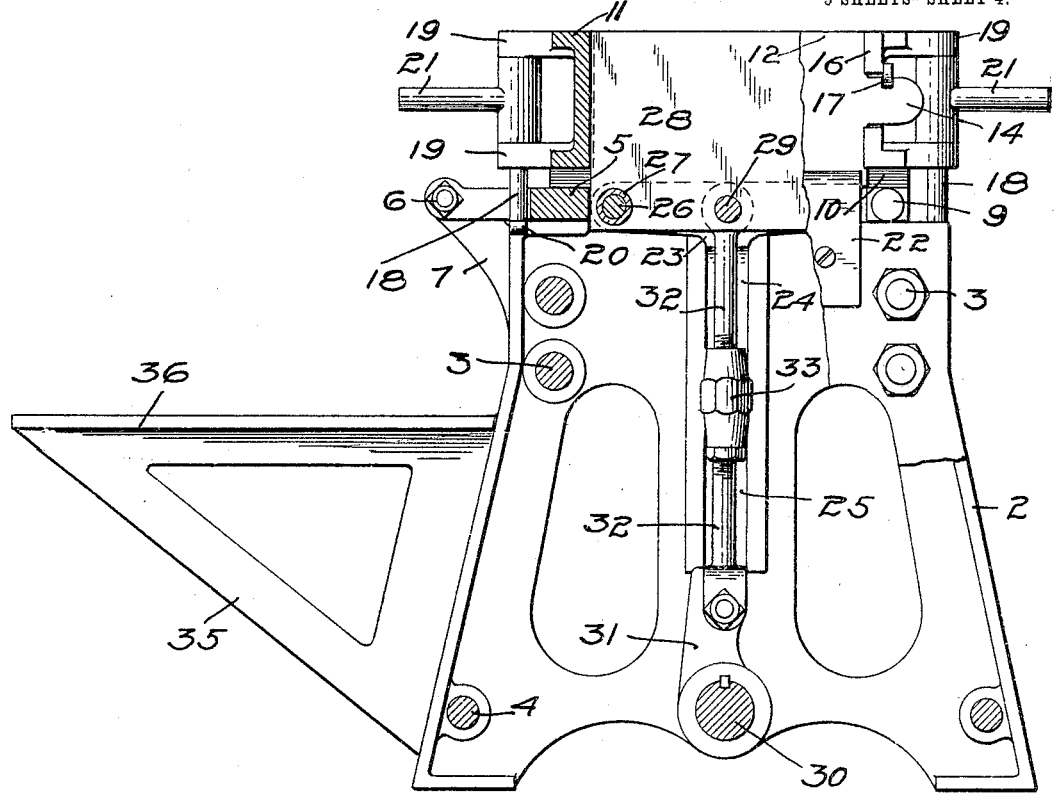
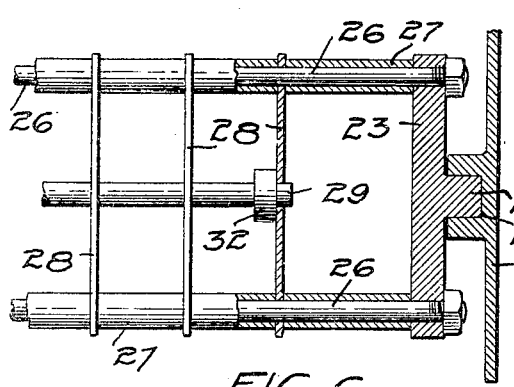
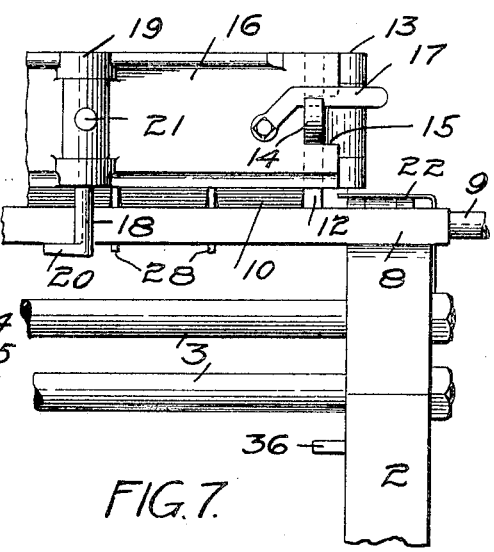

UNITED STATES PATENT OFFICE.

WILLIAM PORTEN, OF ST. PAUL, MINNESOTA.

MOLD FOR BUILDING-BRICK.

No. 804,169. Specification of Letters Patent. Patented Nov. 7, 1905.

Application filed July 17, 1905. Serial No. 270,005.

*To all whom it may concern:*

Be it known that I, WILLIAM PORTEN, of St. Paul, Ramsey county, Minnesota, have invented certain new and useful Improvements in Molds for Building-Brick, of which the following is a specification.

My invention relates to molds for concrete building-brick, and particularly to those adapted for molding brick of the size and characteristics of ordinary pressed brick.

A further object is to provide a mold of large capacity and one that can be easily and quickly operated to mold and deliver the brick.

The invention consists generally in various constructions and combinations, all as hereinafter described, and particularly pointed out in the claims.

In the accompanying drawings, forming part of this specification, Figure 1 is a plan view of a pressed-brick mold embodying my invention, the bricks being shown molded in the machine and ready to be discharged therefrom. Fig. 2 is a similar view illustrating the bricks swung from the bed of the machine and resting upon the plate or pallet in position for removal to a suitable place for drying. Fig. 3 is a longitudinal vertical section of the machine, showing a series of bricks molded therein and ready to be removed. Fig. 4 is an end view, partially in section, illustrating the partitions for the bricks in their raised position. Fig. 5 is a transverse vertical section through the machine, illustrating in dotted lines the mold swung to one side into its discharging position. Fig. 6 is a detail sectional view of the partitions between the bricks and the frame wherein they are mounted, and Fig. 7 is a detail view of the devices for locking the sides of the mold together and securing it on the base or frame during the molding operation.

In the drawings, 2 represents the ends of the base or frame connected and braced at intervals by a series of rods 3 and 4. A bar 5 is hinged at 6 on arms 7, projecting outwardly from the ends 2 of the frame. A bar 8, having handles 9 at each end, is provided on the opposite side of the machine and is connected with the bar 5 by a series of plates 10, which are secured at their ends to said bars and are spaced from one another, as shown, and form the bottom of the mold-box. These plates are preferably of steel and have highly-polished upper surfaces, and I have found that by using these plates and providing a finer quality of sand in the bottom of the mold and contacting with the plates a very hard smooth finish will be formed on the faces of the bricks, corresponding in appearance to the face of the pressed brick made in the usual way. The mold-box, which is placed upon these plates, has a side wall 11 and end walls 12, hinged at 13 to said side wall and provided with notches 14, adapted to enter recesses 15 in the ends of the other side walls 16 and be locked therein by means of latches 17, pivoted on the wall 16 and adapted to enter the notches 14. When these walls are set up on the plates 10 and secured together, they will form the sides and ends of the mold, and by raising the latches 17 the walls 16 can be removed to allow the end walls to be swung outwardly and access be had to the bricks. The walls of the mold are locked in place on the plates 10 by means of rods 18, journaled at 19 in the walls 11 and 16, and having inwardly-turned ends 20, adapted to swing in under the bars 8 and 5 and draw the walls of the mold down securely upon the plates 10 and bind them firmly together while the mold is being swung over upon the supporting-brackets. These rods 18 are provided with suitable operating-handles 21 for convenience of manipulation. Guard-plates 22 are provided between the ends of the bars 8 and 5 to prevent the sand from entering the guides beneath, the edges of said plates being spaced from the contiguous plates 10 to allow the insertion of the end walls 12 between them. (See Fig. 3.)

To separate the bricks as they are being formed in the mold, I provide castings 23, having lugs 24 vertically movable in guides 25 on the ends 2 of the machine-frame and connected with one another by rods 26, whereon sleeves 27 are arranged, separating the plates or partitions 28 from one another and holding them in parallel relation on the said rods. An intermediate rod 29 is provided midway between the rods 26, connecting the plates 28. A rock-shaft 30 is mounted in the base of the machine and provided with arms 31, pivotally connected by rods 32 with the rod 29, a turnbuckle 33 being provided in the rod 32 to allow the vertical travel of the partition-plates and the castings 23 to be regulated. An operating-lever 34 is secured on one end of the rock-shaft 30. Brackets 35, having flat horizontal upper surfaces 36, are provided on one side of the machine and are adapted to receive a support and pallet 37.

The operation of the machine is as follows: The bars 8 and 5 are swung to their proper position over the frame and the mold-box walls placed thereon and secured and the partition-walls raised to divide the mold-box into a series of individual molds, one for each brick to be molded. A fine-sand mixture is then placed in the bottom of the mold-box and tamped down on the steel plates to form the hard smooth faces of the bricks and the mold filled and tamped, and when each brick has been formed the walls are locked and the partitions withdrawn and the pallet 37 placed over the mold and held securely, while the handles 9 are grasped and the mold-box swung to an inverted position over the brackets 35, where, as shown in Fig. 2, the bricks will rest upon the pallet. The walls of the mold are then separated and placed again over the plates 10 to repeat the molding operation, while the bricks are carried away on the pallet to dry.

I claim as my invention—

1. The combination, with a frame, of a mold hinged thereon at one side and adapted to be swung on its hinges to an inverted position, and having suitable handles, means for supporting said mold in its inverted position, said mold having a floor composed of a series of smooth-surfaced plates spaced apart, and partitions separating said plates one from another, said partitions being movable from between the plates to permit the mold to be swung on its hinges, substantially as described.

2. The combination, with a frame, of a mold composed of side bars, one of them hinged to said frame and the other having suitable handles, smooth-surfaced plates arranged parallel to one another at intervals and having their ends secured to said bars and forming the floor of the mold and capable of swinging with the hinged portion of the mold, partitions fitting between said plates, and walls removably mounted on said bars and plates, substantially as described.

3. The combination, with a frame, of a molding-floor hinged thereon at one side and consisting of a series of plates arranged at intervals and adapted to be swung on said hinges to an inverted position, partitions movable between said plates and away from the hinged floor to permit the latter to be swung to one side, and mold-walls removably secured over said plates, substantially as described.

4. The combination, with a frame provided with a bracket on one side below the level of the top of said frame, of a brick-mold hinged to said frame on one side above said bracket and adapted to be swung to an inverted position thereon, movable partitions dividing said mold into a series of independent molds, and means for moving said partitions from the mold to permit the latter to be swung to its inverted position, substantially as described.

5. A concrete-brick mold having a swinging floor composed of a series of smooth-surfaced plates arranged at intervals, side walls separably connected to said floor, and partitions movable between said plates.

6. A concrete-brick mold hinged on one side and having a floor composed of a series of smooth-surfaced metal plates arranged parallel with one another and with spaces between them, partitions movable between said plates, and away therefrom to permit the mold to be swung to an inverted position, and a pallet adapted to be placed over said mold to form the bottom of the same when it is inverted, substantially as described.

7. The combination, with a suitable frame, of a mold hinged at one side thereon and comprising a floor and removable side and end walls, and means for temporarily locking said walls to said floor, said mold being adapted to be swung to an inverted position, a series of partitions dividing said mold into independent molds and capable of being moved away from the floor to permit the mold to be inverted, and a pallet arranged over said mold to support the blocks when the mold is inverted, substantially as described.

In witness whereof I have hereunto set my hand this 13th day of July, 1905.

WILLIAM PORTEN.

Witnesses:
RICHARD PAUL,
C. MACNAMARA.